(12) United States Patent
Ahlbom

(10) Patent No.: US 10,436,518 B2
(45) Date of Patent: Oct. 8, 2019

(54) REMOVAL OF NON-CONDENSABLE GASES FROM A CLOSED LOOP PROCESS

(71) Applicant: ClimeOn AB, Danderyd (SE)

(72) Inventor: Esko Ahlbom, Uppsala (SE)

(73) Assignee: CLIMEON AB, Kista (SE)

( * ) Notice: Subject to any disclaimer, the term of this patent is extended or adjusted under 35 U.S.C. 154(b) by 305 days.

(21) Appl. No.: 15/301,350

(22) PCT Filed: Mar. 26, 2015

(86) PCT No.: PCT/SE2015/050368
§ 371 (c)(1),
(2) Date: Sep. 30, 2016

(87) PCT Pub. No.: WO2015/152796
PCT Pub. Date: Oct. 8, 2015

(65) Prior Publication Data
US 2017/0122670 A1    May 4, 2017

(30) Foreign Application Priority Data

Apr. 4, 2014  (SE) ........................................ 1400182
Jul. 9, 2014   (SE) ........................................ 1400349

(51) Int. Cl.
*F28D 15/02*   (2006.01)
*B01D 5/00*    (2006.01)
(Continued)

(52) U.S. Cl.
CPC ....... *F28D 15/0258* (2013.01); *B01D 5/0027* (2013.01); *B01D 5/0051* (2013.01);
(Continued)

(58) Field of Classification Search
CPC . F28D 15/0258; B01D 5/0027; B01D 5/0051; B01D 5/0072; B01D 5/0093;
(Continued)

(56) References Cited

U.S. PATENT DOCUMENTS 2,062,697 A * 12/1936 Buehler, Jr. ............... F25J 3/00
                                                            62/125
2,598,799 A *  6/1952 Kiene ................... F25B 43/043
                                                            200/81.4
(Continued)

FOREIGN PATENT DOCUMENTS

EP         2098307 A1 * 9/2009 ........... B08B 7/0021

*Primary Examiner* — Cassey D Bauer
*Assistant Examiner* — Gordon A Jones
(74) *Attorney, Agent, or Firm* — Haynes Beffel & Wolfeld LLP; Ernest J. Beffel, Jr.; Andrew L. Dunlap

(57) ABSTRACT

A method which allows the ejection of non-condensable gases, notably air, from a closed loop power generation process or heat pump system, is disclosed. A vessel in which a working fluid is absorbed or condensed can be separated from the power generation processes by valves. Residual gas comprising $CO_2$, non-condensable gas such as air, water and alkaline materials including amines may be compressed by raising the liquid level in said vessel. The concurrent pressure increase leads to the selective absorption of $CO_2$ by alkaline materials. In simpler embodiments, mainly air is removed from one- or two-component processes. Following the compression, non-condensable gas may be vented, optionally through a filter. The method is simple and economic as vacuum pumps may be omitted. The method is useful for any power generation and Rankine cycle, and particularly useful for the power generation process known as C3 or Carbon Carrier Cycle.

11 Claims, 1 Drawing Sheet

(51) Int. Cl.
*F28F 23/00* (2006.01)
*F28F 27/00* (2006.01)
*B01D 53/22* (2006.01)
*F01K 7/16* (2006.01)
*F01K 13/02* (2006.01)

(52) U.S. Cl.
CPC ......... *B01D 5/0072* (2013.01); *B01D 5/0093* (2013.01); *F28F 23/00* (2013.01); *F28F 27/00* (2013.01); *B01D 53/22* (2013.01); *F01K 7/16* (2013.01); *F01K 13/02* (2013.01)

(58) Field of Classification Search
CPC .......... B01D 53/22; F28F 23/00; F28F 27/00; F01K 7/16; F01K 13/02
See application file for complete search history.

(56) References Cited

U.S. PATENT DOCUMENTS

| | | | | |
|---|---|---|---|---|
| 3,145,544 A | * | 8/1964 | Weller | F25B 43/043 62/195 |
| 3,592,017 A | * | 7/1971 | Lipman | F25B 43/043 62/195 |
| 5,389,208 A | * | 2/1995 | Beasley | B01D 1/02 203/100 |
| 5,487,765 A | * | 1/1996 | Kedar | F28B 9/10 165/104.27 |
| 5,538,025 A | * | 7/1996 | Gray | B01D 3/10 134/105 |
| 5,642,630 A | * | 7/1997 | Abdelmalek | B01D 53/1431 62/632 |
| 7,617,701 B2 | * | 11/2009 | Billy | C01B 3/506 62/617 |
| 7,699,914 B1 | * | 4/2010 | Morrow | B01D 53/1406 95/172 |
| 8,475,566 B2 | * | 7/2013 | Find | B01D 53/002 62/617 |
| 9,358,498 B2 | * | 6/2016 | Hatama | F01K 9/00 |
| 9,382,492 B1 | * | 7/2016 | Morrow | C10L 3/104 |
| 9,512,741 B2 | * | 12/2016 | Myogan | F01K 9/00 |
| 2005/0066815 A1 | * | 3/2005 | Krushnevych | B01D 53/1475 96/108 |

* cited by examiner

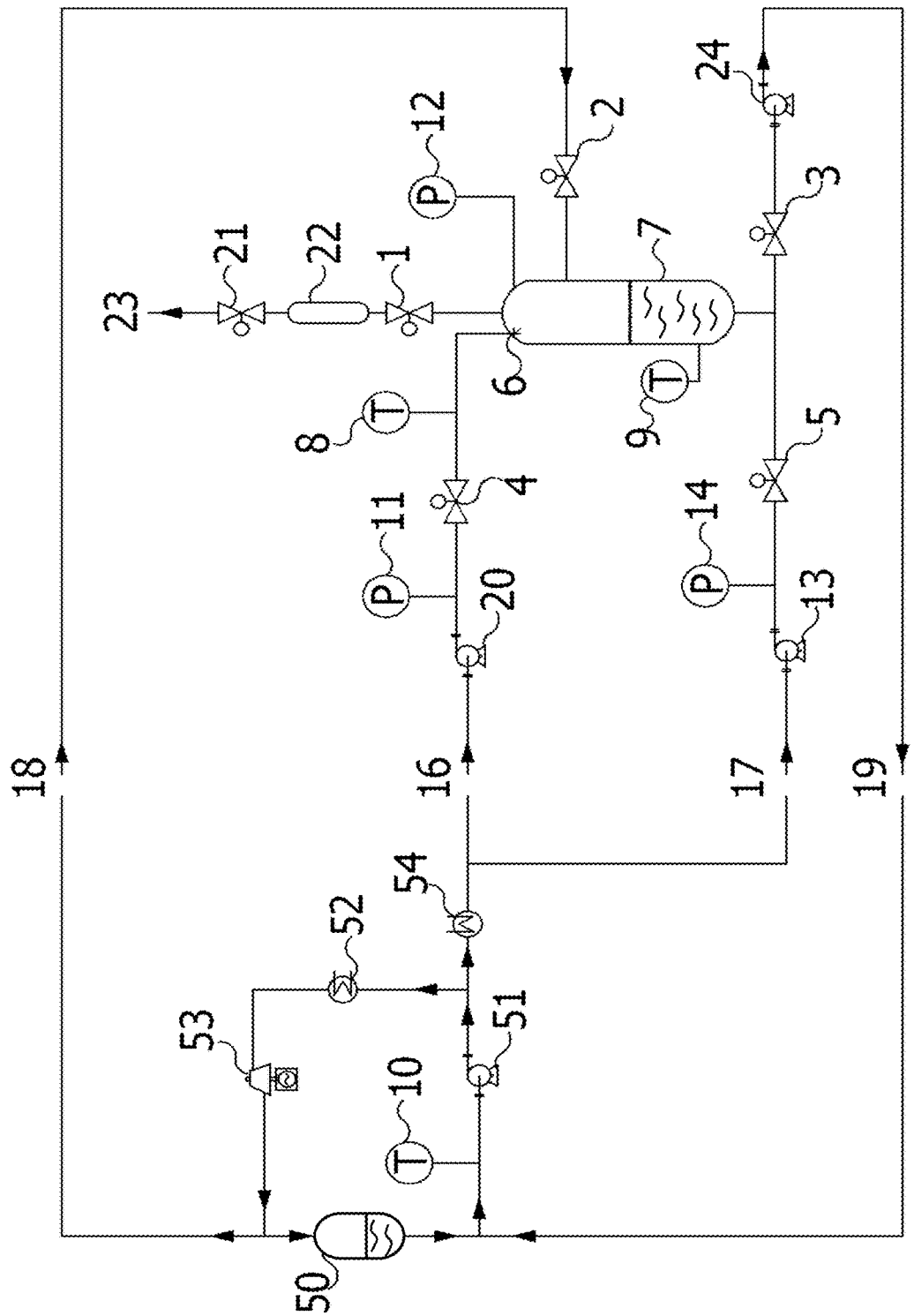

REMOVAL OF NON-CONDENSABLE GASES FROM A CLOSED LOOP PROCESS

FIELD OF THE INVENTION

This invention relates to removal of non-condensable gases from closed loop processes especially in the field of power generation.

DEFINITIONS

Non-condensable gas: air including oxygen, nitrogen and argon, carbon dioxide (CO2); closed-loop power generation process: Rankine cycle, Organic Rankine cycle, ORC, Carbon Carrier Cycle, heat pump system involving compression/heating and expansion/cooling of a working fluid; vacuum: system pressure below 1 bar. In the text, a term such as CO2 or air may denote any non-condensable gas or mixture thereof.

BACKGROUND AND PRIOR ART

Accumulation of undesired gases is a known problem in fields such as chemical engineering and power plant operation. Gas, notably air, leaks into equipment not only operated under vacuum but even into processes operated above atmospheric pressure.

In water-steam based power plants, tray- or spray-based deaerators are used to remove air, see "deaerator" e.g. in Wikipedia. Gas removal from water is affected by making use of Henry's law, i.e. reduced gas solubility at low partial pressure, and the principle that gas solubility is reduced at higher temperatures (see e.g. www.sterlingdearator.com). Also, chemicals such as sodium sulphite can be employed as oxygen scavengers.

Numerous disclosures describe solutions of associated problems, including EP 1 829 594 (Asahi, 2004) for chemical processes, U.S. Pat. No. 4,026,111 (DOW, 1976) for removal of gas from brine for geothermal energy generation, U.S. Pat. No. 4,905,474 (steam condenser application), U.S. Pat. No. 7,588,631 (2006, vacuum deaeration by cyclones), and JP 2006 125 775 (Sanyo Electric, inventor Omori Mitsunori et al) which describes a vacuum pump solution ejecting non-condensable gases from a water/LiBr/octanol based refrigeration machine.

US 2002 000 7732 discloses membrane based separation of a working fluid in power generation from non-condensable gas.

WO 95/27 985 (Pennsylvania Power&Light Company) discusses various solutions attempted in the boiling water reactor industry, see pp. 10 chapter c.

Relevant for this invention is U.S. Pat. No. 5,487,765 (Ormat, 1994) which discloses a separate vessel comprising a membrane or diaphragm through which non-condensable gases diffuse but which retains working fluids such as lower paraffins. This solution is highly useful in an ORC process (Organic Rankine Cycle) in which a working fluid such as butane or pentane (or HCFC) is evaporated at high temperatures and condensed at lower temperature. The pressure difference between the high and low temperature sections is used to operate a turbine for electricity generation.

In energy-generation processes operated partly under vacuum, the risk of air ingress is obviously higher. The C3 process as disclosed in WO 2012/128 715 comprises a CO2 gas loop driving a turbine whereby the CO2 gas is absorbed temporarily in the cold section of the process by e.g. amines and released from said amines at higher temperatures. The process results in a thermodynamic cycle operated between e.g. 2-3 bar on the high pressure side and 0.1-0.3 bar on the low pressure side, giving a high pressure quote and a high heat-to-electricity efficiency. In this process, air ingress on the vacuum side reduces the pressure quote. Therefore, air or other non-condensable gases have to be removed from the process. At the same time, volatile amines shall not be ejected from the process.

Further to the problems not solved by prior art, pumping out residual gas, whether directly from the absorber or condenser or from a separated vessel, leads to unacceptably high removal of especially volatile working fluids, including CO2, amines, and solvents such as acetone. Therefore, a solution is desired which allows the removal of air/non-condensable gas partly at higher pressure than prevailing in the absorber section, this in order to increase the condensation of volatile working fluid, partly at lower temperature than prevailing in the absorber section, also in order to favour condensation of working fluid, and partly at minimum costs, i.e. with minimum or no investment costs especially for vacuum pumps.

Some modifications and specific embodiments of the C3 process are disclosed in documents mentioned below, all of which are included by reference.

BRIEF DESCRIPTION OF THE INVENTION

A vessel in which e.g. CO2 working fluid is absorbed is separated by valves from a power generation process, in particular C3 as described in WO 2012/128 715 and SE 2013/051 059, SE 1300 576-4, SE 1400 027-7 and SE 1400 160-6, hereby incorporated by reference, but also standard ORC solutions based on one or more volatile working fluids such as lower paraffins, classic refrigerants and in general ORC working fluids with boiling points at atmospheric pressure below 100° C. In standard operation, said vessel may function as absorption chamber where CO2 gas is absorbed by amines. During an ejection cycle for non-condensable gas, residual gas comprising CO2, non-condensable gas, water and alkaline materials including amines may be compressed by raising the liquid level in said vessel. The concurrent pressure increase leads to the selective absorption of CO2 by alkaline materials. In this way, the concentration of volatile amines in the gas space is reduced. Following the compression to above atmospheric pressure, non-condensable gas may be vented, optionally through a filter or a membrane in order to absorb remaining volatile amine. Optionally, a membrane or diaphragm may be used separating said vessel into two sections. Said membrane is permeable for air, but impermeable for volatile amines. Ideally, the membrane is not very permeable for CO2 gas. The membrane is ideally not in contact with liquid amine. Remaining or condensing liquid amine may be transferred back to the vessel, also without using a pump. The method is simple and economic as vacuum pumps may be omitted. However, using a vacuum pump is also considered an option for faster removal of non-condensable gases.

DESCRIPTION OF THE FIGURE

The invention will now be described by way of non-limiting examples with reference to the accompanying drawing, in which The figure is a schematic drawing of an arrangement highly suitable for the removal of at least one gas from a closed loop process involving one or two working fluids which are condensed rather than chemically absorbed, further showing how the gas removal unit is integrated into the complete power generation process.

EMBODIMENTS OF THE INVENTION

This invention concerns in one aspect a method or procedure for the removal of at least one non-condensable gas from thermodynamic cycles, particularly from the C3 process mentioned above, which operates partly under vacuum, or ORC processes operating partly under vacuum.

In one embodiment, the working fluid may comprise a low boiling solvent such as methanol, ethanol, acetone, isopropanol or butanol on the one hand at a concentration of at least 5% by weight, and ammonia as well as amines including diethylamine, dipropylamine, dibutylamine, and water-soluble amines including MEA, in water or organic solvents, such as disclosed in above mentioned documents and $CO_2$. The procedures described below are suitable for the automatic and controlled removal air while the power generation cycle is in operation. Pressurizing leads to condensation of condensable gases, such as the solvents mentioned above. Despite this pressurizing step, a certain loss of volatile solvent or amine or $CO_2$ is difficult to avoid but acceptable. Optionally, condensable components can be trapped outside the cycle by means known in the art, such that emissions to the environment are avoided.

In a further aspect, now referring to FIG. 1, an absorption or condensation vessel 7 is in connection with a main absorbing or condensing vessel 50 through a valve 2 and a valve 4. Air removal is achieved in batch operation using the following sequence:

A) A valve 3 is opened to equilibrate the pressure in the condensation vessel 7 and the main condensing vessel 50, while valves 2, 4 and 5 are closed. Condensed working fluid is drained through a line 19 into the main condensing vessel 50, prior to a pump 51. Optionally, a pump 24 is employed for working fluid transfer, e.g. if vessel 7 cannot be emptied by gravity.

B) The valve 4 is opened to start the spraying of cold condensed working fluid supplied through a line 16. The valve 2 is opened to allow ingress of gas through a line 18 from the main condensing vessel 50 which in turn receives gas from turbine 53. Pressures and temperatures are measured by sensors T8 and T9 and T10 as well as P12 and P14.

C) Working fluid condensation leads to a temperature increase, proportional to the condensation enthalpy of the working fluid and proportional to the amount of condensing working fluid. This temperature increase is lower in the condensation vessel 7 than in main condensing vessel 50 partly due to the presence of accumulating non-condensable gases, and partly due to the fact that a higher liquid reflux ratio is used. As the batch sequence progresses, the temperature in the condensation vessel 7 may be 2-4° C. lower than in main condensing vessel 50 for a situation where 90/20° C. water is used for heating/cooling. The temperature difference T8-T9 should be around 30-700 of the corresponding difference T8-T10. If T8-T9 is approaching lower values (<30% of T8-T10), this may be taken as practical indication that no more gaseous working fluid is condensed in the condensation vessel 7. (Note that the given percentage levels are indicative only.) At that stage, the valves 2 and 3 are closed whereas the valve 4 remains open such that working fluid supply through the supply line 16 continues. Part of the remaining gaseous working fluid is condensed due to continued liquid flow and compression of the gas space which is now isolated, and the liquid level in the condensation vessel 7 rises. A further pump 13 may be provided for manipulating the absorption liquid level in said at least one absorption or condensation chamber 7.

D) The valve 4 is closed as soon as the pressure P12 in the condensation vessel 7 is close to or equal to the liquid pressure P11 in the supply line 16 from a cooler 54.

E) The valve 5 is opened such that a pump 20 can supply liquid to the condensation vessel 7. The concurrent pressure increase leads to further condensation of gaseous working fluid.

F) As the pressure in the condensation vessel 7 is approaching the pressure P14 in a supply line 17 which in turn is fed from the supply line 16, the valve 1 is opened to release non-condensable gas through optional secondary vessel 22, optional valve 21 and vent line 23. Vessel 22 may serve as collection or recovery vessel for solvent if required. It is intended to eject as much air as possible, therefore, as a technical option, liquid supply through supply line 17 and valve 5 can continue until the liquid level in the condensation vessel 7 reaches a specified level. Ejection of liquid can be prevented by known methods, e.g. a floating device (not shown in FIG. 1) which blocks the valve 1 if the liquid level is at the maximum level. Diaphragms or membranes essentially impermeable to gases other than oxygen, nitrogen and argon are used e.g. in said secondary vessel 22 to avoid the loss of process gas, notably $CO_2$ and volatile solvent and amine.

G) Step A is repeated.

At a starting time of release of non-condensable gas(es) from said at least one absorption or condensation chamber 7, the pressure in said at least one absorption or condensation chamber is at least 10%, preferably at least 30%, more preferably at least 80%, and most preferably even 150% higher than the pressure in a main absorption or condensation vessel (50).

In the embodiment described above, it appears that the driving force enabling gas separation and subsequent ejection from the closed loop process is the temperature difference between (one or more) condensation vessel(s) 7 and the main absorption or condensation vessel(s) 50. This temperature difference is caused by the fact that liquid working fluid is pumped into the condensation vessel 7 at a higher rate, relative to the flow rate of gaseous working fluid, than into the main absorption vessel 50. Therefore the liquid in the condensation vessel 7 is generally colder than in the main absorption vessel 50. Gaseous working fluid and non-condensable gas is entering the condensation vessel 7. The condensation of main working fluid leads to the enrichment of non-condensable gas in a gas space 6 which further causes the temperature to drop in the condensation vessel 7. At a certain stage, it is practical to start sequence (C) described above.

As described, the fact that liquid in the condensation vessel 7 is colder than at any other stage in the process, is driving the gas separation. Cooling may be affected by the higher liquid flow rate, or alternatively by active cooling. The former method is using less energy, the latter method may be chosen in embodiments where e.g. space requirements dictate so.

Referring further to FIG. 1, also the complete closed-loop process is shown, here as a simple Rankine process with a heat exchanger 52 for generation of hot gaseous working fluid, a turbine 53, the main condensation vessel 50, the temperature sensor T10 and a working medium pump 51. It should be appreciated that working fluid exiting from heat exchanger/absorber/condenser 50 i.e. the main absorption vessel 50 can be partly recycled to the top of the same, e.g.

to achieve a lower average temperature in said main absorption vessel 50 or to aid absorption in the main absorption vessel 50.

In one of the preferred embodiments, acetone is used as working fluid. The solubilities of resp. oxygen and nitrogen are very low in acetone (see Battino, J.Phys.Chem.Ref.Data Vol 12, No.2, 1983, p. 174 and Vol. 13, No. 2, p. 587) such that air removal from acetone even at low temperature (e.g. between 20-40° C. is efficient. Compared to prior-art solutions, loss of acetone or working fluid is significantly reduced.

In one embodiment, the gas mixture ejected from the process, comprising non-condensable gas(es) and minor amounts of solvents including acetone, isopropanol, amines or the like is prevented from entering the environment by use of a cold trap, suitable filters such as carbon black, zeolites or other absorbents, a scrubber or a burning/flaring unit.

In one embodiment, removal of non-condensable gases may be automatically controlled e.g. by a software, whereby gas removal is triggered by one or more process sensor (T8, T9, T10 and P11, P12 and P14) indicating ingress or presence of non-condensable gas, specifically using temperature and pressure sensors (T8, T9, T10 and P11, P12 and P14), directly or indirectly indicating presence of non-condensable gas.

The method described is also useful for air removal from a) steam-based Rankine cycles partly under vacuum but also from b) high pressure ORC systems. In case a) the method would be used to save costs, e.g. for a vacuum pump, in case b) this is relevant because already low air concentrations deteriorate the performance of heat exchangers such as condensors for ORC working fluids. Air ingress cannot be excluded despite the use of higher than atmospheric pressures.

In a different embodiment, the technique for gas removal described above is used in a heat pump system. Essentially, in a heat pump a separate gas compression step is used to generate higher temperatures, e.g. for house heating purposes, from low value heat sources. Suitable heat pump designs operating partly under vacuum are disclosed in SE 1300576-4 assigned to Climeon AB and related disclosures.

It should be understood that above embodiments are merely examples of useful sequences to achieve the objective of the invention, namely to remove non-condensable gases from a closed loop process representing a thermodynamic cycle, specifically the C3 cycle or any Rankine cycle operating partly under vacuum.

Similar arrangements should be seen as falling under the spirit of this invention. In particular, diaphragms or membranes may be included to further reduce the loss of volatile materials such as amines, however, such solutions will be used depending on costs/benefits calculations.

In summary, a simple solution is disclosed for removal of non-condensable gases from closed-loop-processes. The solution is cheap in construction and operation, and can be operated at any time while the thermodynamic cycle is operated, i.e. no stand-still is required.

The methods disclosed here can be used in combination with closed-loop processes comprising working gas and chemicals as temporary and reversible working gas absorption agents. Specifically, the methods can be used combination with the C3 thermodynamic cycle comprising $CO_2$ as working gas and amines as temporary and reversible $CO_2$ absorption agents. Further use is possible in combination with a thermodynamic cycle comprising paraffins such as propane, butane, pentane, hexane, and its isomers, alcohols such as methanol, ethanol, isopropanol, butanol or ketones such as acetone or refrigerants e.g. containing fluorine atoms or water as working gas at a concentration of at least 10% by weight.

Finally, the methods can be used in combination with a heat pump or refrigeration system, preferably operating partly under vacuum.

The invention claimed is:

1. A method for removal of non-condensable gases from a system implementing a closed-loop thermodynamic process involving a condensable working medium, the system including (i) a heat exchanger for generation of a hot gaseous working medium and (ii) a main condensation vessel/heat exchanger for condensation of the condensable working medium from the hot gaseous working medium to a condensed working medium, the method being performed using at least one condensation vessel for condensation of the condensable working medium, the condensation vessel being connected to a vent line via a first valve and connected to the main condensation vessel/heat exchanger through a second valve, a third valve and a fourth valve, the method comprising the steps of:
   (a) opening the third valve to equilibrate the pressure in the at least one condensation vessel and the main condensation vessel/heat exchanger;
   (b) opening the fourth valve to start a spraying of a condensed working medium from the main condensation vessel/heat exchanger into the at least one condensation vessel, and measuring a first temperature in the at least one condensation vessel and a second temperature in the main condensation vessel/heat exchanger;
   (c) closing the third valve to separate the main condensation vessel/heat exchanger from the at least one condensation vessel, while the fourth valve remains open to supply the condensed working medium to the at least one condensation vessel, such that a level of the condensed working medium in the at least one condensation vessel rises;
   (d) closing the fourth valve to stop the supply of the condensed working medium to the condensation vessel; and
   (f) opening the first valve to release and remove non-condensable gases through the vent line,
   wherein step (b) further comprises opening the second valve to allow ingress of a gaseous working medium and accumulating of non-condensed gas from the system into the at least one condensation vessel, whereby a part of the gaseous working medium is condensed and non-condensed gas is accumulated in the at least one condensation vessel, and
   wherein step (c) further comprises closing the second valve to stop the ingress of the gaseous working medium and the accumulating of the non-condensed gas into the at least one condensation vessel, whereby a gas space comprising gaseous working medium and accumulating non-condensed gas, in the at least one condensation vessel is isolated and compressed by the raised level of the condensed working medium, such that a first gas pressure in the at least one condensation vessel is increased to above atmospheric pressure.

2. The method according to claim 1, wherein, steps (c)-(e) are repeated at least once in sequential order to remove non-condensable gas(es).

3. The method according to claim 1, wherein step (c) is initiated when a temperature increase is lower in the at least one condensation vessel than a temperature increase in the main condensation vessel/heat exchanger.

4. The method according to claim 3, wherein the temperature increase in the at least one condensation vessel is calculated based on a temperature difference between (i) a third temperature measured in the condensed working medium before the condensed working medium is supplied into the at least one condensation vessel as a spray and the first temperature of the condensed working medium in the at least one condensation vessel and the temperature increase in the main condensation vessel/heat exchanger is calculated based on a difference between (i) the third temperature and (ii) the second temperature of the condensed working medium in the main condensation vessel/heat exchanger.

5. The method according to claim 4, wherein step (c) is initiated when the temperature difference between the third temperature and the first temperature is less than 30% of the temperature difference between the third temperature and the second temperature.

6. The method according to claim 1, wherein, the spraying of the condensed working medium from the main condensation vessel/heat exchanger into the at least one condensation vessel is performed using a cold condensed working medium actively cooled by a cooler.

7. The method according to claim 1, wherein step (e) further comprises releasing the non-condensable gases from the at least one condensation vessel through diaphragms or membranes that are essentially impermeable to gases other than the non-condensable gases, and through a cold trap arranged in connection with the vent line.

8. The method according to claim 1, wherein step (f) further comprises releasing the non-condensable gases from the at least one condensation vessel through diaphragms or membranes that are essentially impermeable to gases other than the non-condensable gases, and through a filter arranged in connection with the vent line.

9. The method according to claim 1, wherein step (f) further comprises releasing the non-condensable gases from the at least one condensation vessel through diaphragms or membranes that are essentially impermeable to gases other than the non-condensable gases, and through a gas scrubber arranged in connection with the vent line.

10. The method according to claim 1, wherein step (f) further comprises releasing the non-condensable gases from the at least one condensation vessel through diaphragms or membranes that are essentially impermeable to gases other than the non-condensable gases, and through a burning/flaring unit arranged in connection with the vent line.

11. A use of the method according to claim 1 in combination with a closed-loop thermodynamic processes comprising working medium operating partly under vacuum.

* * * * *